Patented Jan. 14, 1936

2,027,801

UNITED STATES PATENT OFFICE 2,027,801

PROCESS OF TREATING COFFEE

Harold K. Wilder, Battle Creek, Mich., assignor to Kellogg Company, Battle Creek, Mich., a corporation of Delaware No Drawing. Application December 14, 1933, Serial No. 702,363

21 Claims. (Cl. 99—5)

This invention has for its object the provision of a process for improving the flavor of coffee. More specifically, it relates to a process for treating so-called green coffee whereby such coffee shall develop, when roasted, a more desirable flavor than the same coffee would have had without this treatment.

The process is applicable, as a practical example, for improving the flavor of Santos coffee, a type grown in Brazil, so as to impart to such coffee, when roasted, a more pleasant and desirable flavor and aroma, simulating the flavor and aroma of certain coffees produced in Central America and other places, and commercially designated as "Milds". The process is, however, adapted to the treatment of other coffees, that is, coffees having a strong or rank flavor when brewed, as distinguished from the characteristic pleasing flavor and aroma of the so-called "Mild" coffees, and also to the treatment of freshly picked coffee during or as a part of the curing process.

The process may be usefully employed in converting the flavor of a "dry-process" cured coffee to that type of flavor which has been characteristic of coffees cured by the so-called "wet process".

It is not the object of this process to artificially "age" such coffee for improvement of its appearance. No attempt is made to secure the influence of time upon dry coffees. The treatment is effected at a higher moisture content for the purpose of promoting the development of certain substances latent within the coffee bean but which are not developed when the coffee is cured by the "dry" process.

It is well known that certain coffees are cured by a so-called "wet process" wherein the coffee, during the curing process, is placed in vats or tanks in a moist condition to promote a type of fermentation which will loosen the pulpy matter surrounding the coffee beans and permit the separation of the beans from their natural external coating. The coffee is first passed through a "pulper" which removes the outer skin of the coffee cherry and some of the soft, gelatinous inner layer. After suitable moist treatment for a period of about twenty-four hours the coffee is separated mechanically from the residual soft outer coating, is washed free from loosened pulp etc. and is finally dried. Certain coffees from Colombia and other Central American countries are so processed. The flavor of such coffees is a typical one, causing these coffees to be classed in the trade as "Mild" coffees or "Milds".

In contrast to the above treatment, another process, called the "dry process" of curing, is practiced in Brazil and other places, where through lack of water or for climatic or other reasons the so-called "wet process" cannot be, or at any rate is not, used. Such coffees have a less desirable flavor and aroma and when roasted afford a brew which lacks the peculiar fragrance typical of a so-called "Mild" coffee. These dry-process coffees have a strong flavor and aroma and are suitable for use as a part of a final blend, but lack the peculiar fragrance for which the "Mild" coffees are highly prized.

The present invention recognizes the essential difference in flavor between the wet-process and dry-process coffees to be a difference due to certain chemical reactions, which proceed spontaneously under the influence of favorable conditions of moisture and temperature during the curing process for wet-process coffees, but which are inhibited by premature drying or unsuitable temperature conditions of those coffees which are cured by the "dry process".

It may thus be seen that the two great classes into which coffees are commercially divided differ principally in the degree to which certain reactions have proceeded within the coffee bean. The commercial coffee merchants have recognized the greater value of the "wet process" coffees and have paid premium prices for such coffees. Moreover, numerous attempts have been made to introduce the wet process of treatment into such countries as Brazil, where the dry process predominates. Such attempts have not been successful because of lack of water in commercial quantities, unfavorable climatic conditions and other reasons. Even where the wet process could be practiced, it has generally failed to produce the desired flavor, thus leading to the conclusion that use of the wet process would not produce desirable results on, for example, Brazilian coffee.

With this understanding of the fundamental difference between "wet" process and "dry" process coffees, it becomes clear that the fundamental substances responsible for better flavors in certain coffees are present in many coffees, but have remained merely latent since their presence has not been recognized, and thus not being recognized, no one has been able to devise or to create a process by which to promote the typical enzymatic reactions, which result in the formation of those substances which cause the development of desirable flavors when the coffee is roasted.

It has been discovered by me as the result of many experiments and tests that there is no great fundamental difference between Brazil coffees and the so-called "Mild" coffees in their ripened condition on the trees, nor between the two types of coffees as produced elsewhere in the world. Practically all of these coffees are botanically of the species *Coffea Liberica* or *Coffea Arabica,* even though grown in widely different parts of the world. The difference lies in the extent, heretofore unrecognized, to which the process of treatment has permitted the desired enzymatic reactions to take place.

The present invention, recognizing the wide variation in the flavors of coffees produced under more or less similar circumstances, provides a process whereby such coffees may be made substantially uniform in flavor and aroma.

It is well known that coffees produced under presumably similar conditions and in the same locality will be found to vary widely in actual flavor, thus necessitating that coffees grown on different plantations be tested as individual lots to determine their market value. Due to this variation, it has become a standard practice in the coffee industry to refrain from mixing different lots of green coffee, except as certain small lots may be mixed after test to determine that the roasting characteristics of the several lots are practically identical. Thus the coffee merchant does not offer to the trade so many tons of coffee of a certain grade, but offers coffee of a single grade in many small lots, designated by the trade as "chops", a sample of each of which is furnished to the prospective purchaser so that he may roast and test in the cup each lot so offered in order to select those "chops" which he finds to have the flavor which he desires. Each "chop" contains from one hundred to, say, two thousand bags of coffee, depending upon the quantity of coffee harvested and processed together on the coffee plantation. Thus the crop from every individual plantation is sent to market bearing one or more "chop marks" which serve to identify this particular batch of coffee up to the time the coffee roaster blends this with other "chops" to secure the desired degree and character of flavor.

In the practical examination of such "chops" of a "Mild" coffee, as for example, the examination of various "chops" of Colombian coffees, many different flavors are found, even though all of the "chops" may be representative of a single grade of coffee. In the purchase of corn or wheat, the designation of the specific variety and the United States grade classification, as number 1, number 2 or number 3, suffices for all practical purposes to permit the buyer and seller to gain a common understanding of the type and quality of the merchandise offered. Corn, wheat or other grains may be bought upon such grade designations with reasonable assurance that a consignment so purchased will be satisfactory when received.

In contrast to this practice, the coffee merchant describes his coffee by commercial type, locality in which grown, port of shipment, coffee exchange grading (depending upon the number of impurities and imperfect beans present in a pound), color, appearance, general description of the flavor, and finally supplements all this by one pound samples of numerous "chops" meeting the above description, in order that the buyer may select, from those offered, one or more "chops" which will provide him with the desired number of bags of coffee of a suitable flavor.

Even in coffees of high grade, the flavor will vary greatly between different "chops". Thus, in selecting high grade Colombian coffees, a group of a dozen samples will reveal numerous differences in flavor, and generally two or three of the samples will be found to have the much desired fine flavor, and these few command a higher price, although it is necessary to test these particular "chops" in the cup to determine why the higher price is justified. The higher price will be found on those coffees having the prized "Mild" coffee flavor in just the proper intensity. Other "chops" will be found to vary in flavor from a weak flavor to perhaps some in which the flavor is entirely too strong. The present discussion is dealing with "wet-process" coffees which presumably have the desired "Mild" coffee flavor. Yet the flavor lacks uniformity. Aside from definitely damaged coffees, the industry has lacked means for controlling these variations in flavor.

In view of the revelations of the present invention it becomes clear that these flavor variations were caused by variations in the condition of processing the coffee. Thus, hot weather or too long fermentation for pulp removal may have caused excessive flavor development, thus spoiling an otherwise good coffee. On the other hand, cool weather, hasty treatment or lack of proper moisture content may have resulted in lack of proper development of flavor, a condition noted on the great majority of all samples of commercial "chops" tested by me.

The present invention contemplates not only the development of the characteristic "Mild" coffee flavor in those coffees commonly lacking this flavor, but also a reliable and definite control of the flavor of regular "Mild" coffees through a knowledge of the chemical reactions responsible for developing such flavors during the commercial processing of the coffee. Since the invention has shown it to be possible to develop the desirable flavor in classes of coffees formerly considered as being outside the "Mild" coffee types, it is evident that a definite control of conditions would permit the more uniform development of the desired flavor in characteristic "Mild" coffees which are cured by the so-called "wet" process.

This invention is not to be confused with the so-called processes for "aging" of coffee wherein the effects of long time storage have been simulated in shorter periods of time. The process does not reproduce the characteristic results of such "aging", but more specifically promotes those enzymatic reactions which should be produced by proper treatment in the curing of the coffee but which, due to lack of appreciation of their effects or some unfavorable circumstances, are not properly developed. As a matter of fact, and as distinguished from such "aging" process, this process is applicable only to those coffees which have not lost their power of enzymatic action through age.

Tests on coffees judged to be two to four years old have shown those coffees to be less responsive than new crop coffees to treatment by the process of the invention, so that the present process is really a step in the curing of freshly ripened green coffees rather than an aging process. The chemical substances known as enzymes are believed to be responsible for the results of the present process, and the process must be practiced while these enzymes are still active and capable of converting certain chemical substances within the coffee beans. Aged coffees will not react as favorably to this process. The process is designated to provide a treatment to be used in preparing the green coffee for market. By green coffee is meant coffee which has not been cured as well as coffee which has been cured but which lacks the desired flavor of first-grade mild coffee or "Milds".

The actual practice of this invention has two aspects, first the treatment of green coffees which have been already cured, and second the subjection of uncured green coffees to suitable temperatures for proper development of flavor prior to completion of drying in the normal curing process for the ripe coffee beans.

In the first aspect, the treatment consists in subjecting dried green coffee to a moistening with water to restore it to a less dry condition, then subjecting it to an elevated temperature for a proper length of time, then followed by subsequent re-drying. A temperature of 140 degrees F. for seven to fifteen hours has been found to give satisfactory results, although temperatures from 90 degrees F. to 160 degrees F. can be used, the time being reduced as the temperature is increased. In other words, the time of treatment varies inversely with the temperature. With a temperature ranging somewhat above 90 degrees, for example, the time of treatment would be substantially increased; while with a temperature approaching 160 degrees, the time of treatment would be reduced to a matter of a few hours only. The time of treatment is varied within limits depending upon whether it is desired to use one hundred per cent of the treated coffee or whether a more intense flavor is desired in order that a lesser proportion of the product may be blended with untreated coffee.

Temperatures of about 170 degrees F. or higher will destroy the enzymes which promote the desired reactions so that it is vitally important that the coffee beans shall not be subjected to steam at atmospheric pressure or higher in quantities which could raise the temperature of the coffee beans to 170 degrees F.

A moisture content of sixteen per cent has been found satisfactory, although favorable results may be obtained at higher moisture contents, up to that of the natural green coffee berry. At twelve per cent moisture content the reaction proceeds more slowly and at nine per cent (the natural moisture content of dried coffee beans) the reaction is scarcely detectable up to two or three days' treatment. Treatment of coffee while maintained in a dry state thus will not produce the desired result.

In the case of cured coffee, that is, for example, Santos coffee which has been cured by the dry process, the treatment is as follows:

The coffee is uniformly moistened with water, as by spraying or otherwise, to bring its moisture content preferably to about fifteen per cent by weight. The coffee beans should be uniformly moistened. The coffee is then placed in a heated container or drum which is preferably closed to prevent loss of moisture and is rotated and maintained at a temperature of 140 degrees F. for about seven to fifteen hours. The coffee is then re-dried to about ten to eleven per cent moisture content, when it may be stored awaiting the roasting operation.

The drum or container may be heated by hot air surrounding the drum or it may be steam jacketed. If a steam jacket is used the steam should preferably be under controlled pressure reduced to a partial vacuum, say a twenty-four inch vacuum, to avoid overheating. Rotation of the drum to agitate the beans insures their being heated uniformly.

In the case of freshly picked coffee while in the hull and containing the natural moisture content of ripe coffee cherries, the processing may be as follows: This process applies also if the cherries have been partly but not completely dried.

The coffee cherries are macerated to loosen and remove the outer hull, and are then placed, in a moist condition, in vats for fermentation to soften the gelatinous pulp and permit its removal from the coffee. During this process the time and temperature shall be carefully controlled to yield a product of uniform flavor and aroma rather than to allow the flavor to be subject to variation due to weather conditions and other circumstances.

Other illustrations of practicing the process are as follows:

In the case of freshly picked coffee while in the hull and to be treated for flavor development before drying is started:

The freshly picked coffee is placed in a suitable heating chamber where it is raised to a temperature of about 140 degrees F. The coffee is kept at a uniform temperature of about 140 degrees F. for seven to fifteen hours, according to the degree of flavor development desired. After heating, the coffee is cooled to normal air temperature, and then dried, as by being spread out in the open air according to the customary practice, or in any other suitable manner. The subsequent treatment is the same as for ordinary coffee.

In the case of freshly picked coffee while in the hull and to be treated by the so-called "dry process":

The freshly picked coffee is spread out on the drying grounds and partly dried, until the beans are withered but not completely dry. When the beans appear about two-thirds dried, or when the moisture content has decreased to about twenty to thirty per cent, the coffee is placed in a suitable heating chamber and is maintained at a uniform temperature of about 140 degrees F. for about seven to fifteen hours. The coffee is then spread out on the drying grounds and further dried. The coffee is then treated by the common method customarily practiced in the art of preparing the so-called "dry process" coffee.

Thus the process of my invention is not only adapted to improving the flavor of coffee which has already been cured, but is also designed to be employed for producing from coffee fresh from the trees a product having uniformly a more desirable flavor and aroma than would result from the usual curing process.

I claim:

1. A process for improving the flavor of coffee, comprising heating green coffee beans having a moisture content while under treatment in excess of the natural moisture content of dried coffee beans; to an elevated temperature but less than 170 degrees F. for several hours to permit the enzymes thereof to convert the chemical substances within the beans, the time varying inversely with the temperature.

2. A process for improving the flavor of coffee which consists in heating green coffee beans having a moisture content while under treatment in excess of the natural moisture content of dried coffee beans, to a temperature not in excess of about 160° F. for several hours.

3. A process for improving the flavor of coffee which consists in heating green coffee beans to a temperature not in excess of 160° F. for several hours while maintaining the moisture content thereof in excess of that which characterizes dried coffee beans.

4. A process of treating coffee for improving its flavor, comprising heating green coffee beans to a temperature of between 90° F. and something less than 170° F. for several hours while maintaining the moisture content of the beans in excess of the natural moisture content of dried coffee beans, the time varying inversely with the temperature.

5. A process for improving the flavor of coffee, comprising heating green coffee beans while having a moisture content in excess of the natural moisture content of dried coffee beans, and whether hulled or unhulled, to a temperature between 90° F. and about 160° F. for several hours.

6. A process for improving the flavor of coffee, comprising heating green coffee beans while maintaining the moisture content thereof in excess of the natural moisture content of dried coffee beans; to a temperature between 90 degrees F. and about 160 degrees F. for several hours.

7. A process for improving the flavor of coffee, comprising heating green coffee beans having a moisture content while under treatment in excess of the natural moisture content of dried coffee beans, to a temperature of not more than about 160 degrees F. nor less than 90 degrees F. for a time within the range of enzymatic conversion at the temperature employed, the time varying inversely with the temperature.

8. A process for improving the flavor of coffee, comprising heating green coffee beans having a moisture content while under treatment in excess of the natural moisture content of dried coffee beans; to a temperature of not more than 160 degrees F. nor less than 90 degrees F. for several hours, the time varying inversely with the temperature.

9. A process for improving the flavor of coffee, comprising heating green coffee beans having a moisture content while under treatment in excess of the natural moisture content of dried coffee beans, to a temperature of not more than about 160 degrees F. nor less than 90 degrees F. for several hours.

10. A process for improving the flavor of coffee, comprising heating for from seven to fifteen hours green coffee beans having a moisture content while under treatment in excess of the natural moisture content of dried coffee beans, to a temperature of not more than about 160 degrees F. nor less than 90 degrees F., the time varying inversely with the temperature.

11. A process of treating coffee for improving its flavor, comprising heating in an impervious container green coffee beans having a moisture content in excess of that which characterizes dried coffee beans to a temperature of between 90° F. and something less than 170° F. for from seven to fifteen hours, the time varying inversely with the temperature.

12. A process for improving the flavor of coffee, comprising heating in a hermetically closed container at substantially atmospheric pressure green coffee beans having a moisture content in excess of the natural moisture content of dried coffee beans and while the enzymes are still active and capable of converting certain chemical substances within the beans, to a temperature of not more than about 160 degrees F. nor less than 90 degrees F. for a period of from seven to fifteen hours.

13. A process for improving the flavor of coffee, comprising heating in an impervious jacketed container at substantially atmospheric pressure green coffee beans, whether hulled or not, having a moisture content of the order of that of the natural ripe beans, to a temperature not in excess of about 160 degrees F. nor less than 90 degrees F., and continuing such heating for several hours.

14. A process for improving the flavor of coffee, comprising heating in an impervious jacketed container at substantially atmospheric pressure green coffee beans having a moisture content in excess of the natural moisture content of dried coffee beans and while the enzymes of the coffee beans are still active, to a temperature of not over 160 degrees F. and not less than 90 degrees F. for several hours.

15. A process for improving the flavor of coffee, consisting in moistening dry green coffee beans with water to restore the same to substantially their former undried condition and then subjecting the thus moistened beans to heat at an elevated temperature not exceeding 160 degrees F. for from seven to fifteen hours while maintaining the moisture content of the beans in excess of the natural moisture content of dried coffee beans, and finally drying the beans to about air dry condition.

16. A process for improving the flavor of coffee, comprising heating green coffee beans having a moisture content while under treatment in excess of the moisture content which characterizes dried coffee beans, in an impervious container and at substantially atmospheric pressure, to a temperature of from 90 degrees F. to 160 degrees F. for several hours and sufficient to permit the enzymes to convert the chemical substances within the beans but short of complete conversion, the time varying inversely with the temperature.

17. The process for improving the flavor of coffee, comprising wetting cured green coffee beans to bring the moisture content thereof to about fifteen per cent, thereafter heating the beans in an impervious container to about 140 degrees F. for from about seven to fifteen hours, and then drying the beans to about ten to eleven per cent moisture content.

18. The process for improving the flavor of coffee, comprising spraying dried green coffee beans with water to bring the moisture content thereof to about fifteen per cent, thereafter heating the beans in a closed container to a temperature of about 140 degrees F. and continuing the heating for from about seven to fifteen hours, meanwhile agitating the coffee beans, and then drying the beans to about ten to eleven per cent moisture content.

19. The process for improving the flavor of coffee, comprising spraying dry green coffee beans with water to bring the moisture content thereof to about fifteen per cent, thereafter heating the beans in a closed container to a temperature of about 140 degrees F. and continuing the heating for from about seven to fifteen hours, meanwhile agitating the coffee beans, and then drying the beans to about air dry condition.

20. The process for improving the flavor of coffee, comprising macerating freshly picked coffee cherries to loosen the outer hull, placing the mass while still in a moist condition in vats for fermentation to soften the gelatinous pulp and permit its removal from the beans, and subjecting the coffee beans while in their then moist condition to heat at a temperature of from 90 degrees F. to about 160 degrees F. for from about seven to fifteen hours while maintaining the moisture content of the same in excess of the natural moisture content of dried coffee beans.

21. A process for improving the flavor of coffee, comprising subjecting coffee beans in the condition in which they are when separated from the hull and having a moisture content substantially the same as that normally present in the ripe beans when they come from the tree, to heat at a temperature of between 90 degrees F. and about 160 degrees F. in a closed impervious container and at substantially atmospheric pressure for from seven to fifteen hours.

HAROLD K. WILDER.